US012750913B2

(12) United States Patent
Yang et al.

(10) Patent No.: US 12,750,913 B2
(45) Date of Patent: Sep. 29, 2026

(54) SYSTEMS AND METHODS FOR QUALITY OF SERVICE BASED DISCONTINUOUS TRANSMISSIONS

(71) Applicant: Verizon Patent and Licensing Inc., Basking Ridge, NJ (US)

(72) Inventors: Jin Yang, Orinda, CA (US); Susan Wu Sanders, Bridgewater, NJ (US); Lei Song, Basking Ridge, NJ (US); Xin Wang, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 689 days.

(21) Appl. No.: 17/933,692

(22) Filed: Sep. 20, 2022

(65) Prior Publication Data

US 2024/0098837 A1 Mar. 21, 2024

(51) Int. Cl.
*H04W 76/28* (2018.01)
*H04W 28/02* (2009.01)
*H04W 72/21* (2023.01)

(52) U.S. Cl.
CPC ....... *H04W 76/28* (2018.02); *H04W 28/0268* (2013.01); *H04W 72/21* (2023.01)

(58) Field of Classification Search
CPC .. H04W 76/28; H04W 28/0268; H04W 72/21
See application file for complete search history.

(56) References Cited

U.S. PATENT DOCUMENTS

| | | | | |
|---|---|---|---|---|
| 2006/0221829 A1* | 10/2006 | Holmstrom | H04W 28/24 | 370/230 |
| 2008/0293426 A1* | 11/2008 | Kim | H04W 76/28 | 455/450 |
| 2010/0014429 A1* | 1/2010 | Kim | H04W 52/0216 | 370/329 |
| 2012/0207040 A1* | 8/2012 | Comsa | H04W 72/1215 | 370/252 |
| 2015/0289289 A1* | 10/2015 | Qian | H04L 5/0055 | 370/329 |
| 2016/0044739 A1* | 2/2016 | Morita | H04W 52/0206 | 370/329 |
| 2017/0171907 A1* | 6/2017 | Agarwal | H04W 52/0219 | |
| 2017/0202052 A1* | 7/2017 | Xu | H04W 72/541 | |
| 2019/0182896 A1* | 6/2019 | Shrestha | H04L 5/00 | |
| 2022/0322459 A1* | 10/2022 | Zhou | H04W 72/21 | |
| 2023/0354188 A1* | 11/2023 | Akl | H04W 76/28 | |
| 2024/0022967 A1* | 1/2024 | Liu | H04W 28/26 | |

(Continued)

*Primary Examiner* — Yemane Mesfin
*Assistant Examiner* — Guoxing Fan

(57) ABSTRACT

A user equipment (UE) device may include a processor configured to obtain a configuration specification for at least one discontinuous transmission parameter, wherein the configuration specification includes different values for at least two different Quality of Service (QoS) classes. The processor may be further configured to detect uplink data that is to be sent by the UE device to a device via a base station; determine a QoS class associated with the uplink data; select a value for the at least one discontinuous transmission parameter based on the configuration specification and the determined QoS class associated with the uplink data; and send the uplink data to the base station based on the selected value for the at least one discontinuous transmission parameter.

20 Claims, 8 Drawing Sheets

(56) References Cited

U.S. PATENT DOCUMENTS

| | | | | |
|---|---|---|---|---|
| 2024/0188103 | A1* | 6/2024 | Löhr | H04W 76/14 |
| 2024/0196474 | A1* | 6/2024 | Zhao | H04W 76/28 |
| 2024/0414806 | A1* | 12/2024 | Zhao | H04W 76/14 |

* cited by examiner

SYSTEMS AND METHODS FOR QUALITY OF SERVICE BASED DISCONTINUOUS TRANSMISSIONS

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. For example, a wireless access network may need to manage a large number of communication sessions. Maintaining a large number of communication sessions may pose various challenges.

DETAILED DESCRIPTION OF EMBODIMENTS

Figure 1:
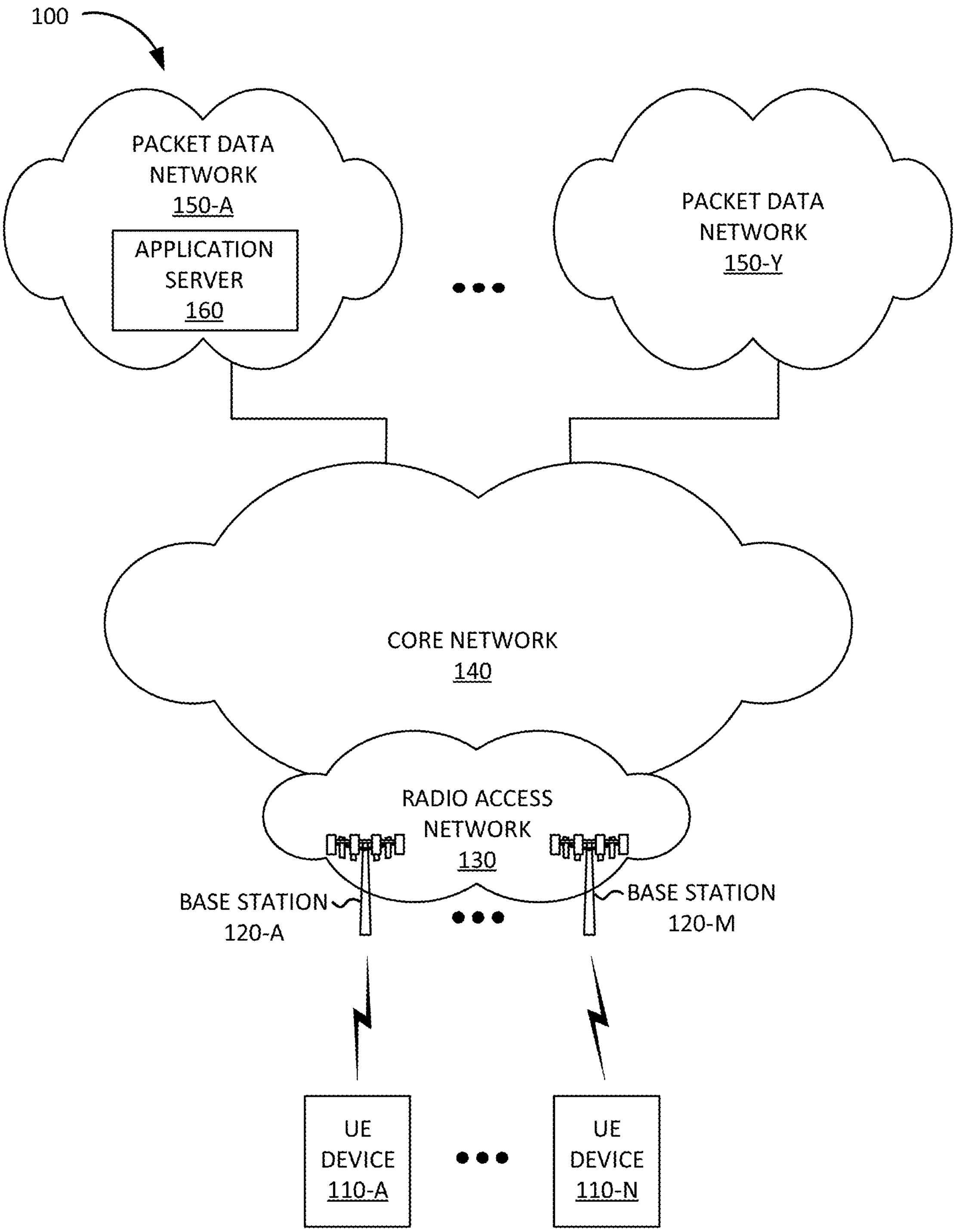
FIG. 1 illustrates an environment according to an implementation described herein.

The following detailed description refers to the accompanying drawings. The same reference numbers in different drawings identify the same or similar elements.

A wireless communication device, referred to as a user equipment (UE) device, may attach to a core network, such as Fourth Generation (4G) or Fifth Generation (5G) core network, via a base station in a Radio Access Network (RAN). The UE device may establish an Internet Protocol (IP) connection with a device, such as an application server, in a network and may exchange data with the device at particular intervals or in response to an event. If a UE device is continuously awake (e.g., not in a reduced power mode, etc.) in order to send or receive data via a base station, the UE device may consume a lot of power, which may significantly reduce battery life.

In order to conserve power and extend the duration of a battery charge, a UE device may enter a discontinuous transmission mode. In a discontinuous transmission mode, a UE device may power down the transmitter and/or enter a sleep mode or power saving mode in order to reduce power use. While in discontinuous transmission, the UE device may wake up at particular intervals (e.g., power up particular components, such as a wireless transceiver, etc.) to check whether there is any uplink data to be sent to the network. If there is no uplink data to be sent to the network, the UE device returns to the sleep mode until the next wake up cycle. Thus, the wake-up cycle may include a wake-up period, referred to as the on-duration period, and a sleep period, referred to as an off period of the cycle. Together, the on-duration period and the off-duration period may correspond to the discontinuous transmission long cycle.

However, the UE device may detect uplink data to be sent to the network while not in the on-duration period. If the UE device detects uplink data to be sent to the network while not in the on-duration period, the UE device may exit the sleep or reduced power mode to send the uplink data to the network. In order to send the uplink data to the base station, the UE device may send a scheduling request to the base station. The scheduling request may be sent on a Physical Uplink Control Channel (PUCCH) at particular intervals until the base station responds by granting the scheduling request. If the UE device does not receive an uplink scheduling grant from the base station after a specified number of scheduling requests (e.g., if the signal conditions are poor, etc.), the UE device may need to switch to a Physical Random Access Channel (PRACH), to send the service requests, Sending the requests over the PRACH may increase latency and waste network resources.

The UE device may be configured to run a wait timer to cause the UE device to wait a particular time period after detecting the uplink data before sending a scheduling request. For example, the UE device may wait 10 milliseconds (ms) after detecting uplink data before sending a scheduling request. Use of a wait timer may lead to significant conservation of battery power over time. However, the wait time may interfere with meeting latency requirements in low latency communications. Furthermore, the UE device may send scheduling requests at particular intervals, referred to as a scheduling requests period. For example, the UE device may send a scheduling request to the base station every 20 ms. A longer scheduling requests period may lead to greater savings in battery power, but may interfere with latency requirements in low latency communications. Therefore, low latency communications may require modifying a wait timer and/or a scheduling requests period while a UE device is in a discontinuous transmission mode.

Implementations described herein relate to systems and methods for QoS-based discontinuous transmissions. A UE device may be configured to obtain a configuration specification for discontinuous transmission parameters, which include different parameter values for at least two different QoS classes. The UE device may be configured to detect uplink data that is to be sent by the UE device to a device via a base station, determine a QoS class associated with the uplink data, select values for the discontinuous transmission parameters based on the configuration specification and the determined QoS class associated with the uplink data, and send the uplink data to the base station based on the selected values for the discontinuous transmission parameters.

In some implementations, the UE device may obtain the configuration specification from a Subscriber Identity Module (SIM), a SIM-like device (e.g., an embedded SIM (eSIM), a Universal Integrated Circuit Card (UICC), an embedded UICC (eUICC), etc.), a wireless chipset, and/or another component associated with the UE device. In other implementations, the UE device may obtain the configuration specification by receiving a message from a device associated with a provider network, such as, for example, a base station, a network node or network function (NF) in a core network, and/or an application server in a packet data network (PDN) associated with the core network. In some implementations, the message may include a Radio Resource Control (RRC) message.

The configuration specification may include an instruction to activate a parameter value, for a discontinuous transmission parameter, which is shorter in duration than a default value for the at least one discontinuous transmission parameter, for uplink data associated with a low latency QoS class. The discontinuous transmission parameter may include a wait timer configured to cause the UE device to wait a particular time period after detecting the uplink data before sending a scheduling request. For example, the configuration specification may include a wait timer value of 1 ms or less for uplink data associated with a low latency QoS class and a higher value, such as a 10 ms value, for uplink data associated with QoS classes that do not have a low latency requirement. In other implementations, more than two wait timer values may be specified. For example, each different QoS class may have a different assigned wait timer value.

The discontinuous transmission parameter may include a period for sending scheduling requests to the base station. For example, the configuration specification may include a period value which is shorter in duration than a default period value for sending scheduling requests, for uplink data associated with a low latency QoS class. For example, the configuration specification may include a scheduling requests period value of 1 ms or less for uplink data associated with a low latency QoS class and a higher scheduling requests period value, such as a 20 ms value, for uplink data associated with QoS classes that do not have a low latency requirement. In other implementations, more than two scheduling requests period values may be specified. For example, each different QoS class may have a different assigned scheduling requests period value.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in RAN 130, core network 140, and PDNs 150-A to 150-Y (referred to herein collectively as "PDNs 150" and individually as "PDN 150").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV™, Google Chromecast™, Amazon Fire TV™ etc.), a WiFi access point, a smart television, etc.; a portable gaming system; a global positioning system (GPS) device; a home appliance device; a home monitoring device; and/or any other type of computer device with wireless communication capabilities and a user interface.

In some implementations, UE device 110 may include an IoT device that communicates using machine-to-machine (M2M) communication, such as Machine Type Communication (MTC), and/or another type of M2M communication for IoT applications. For example, IoT devices may be used in utility meters, environmental sensors, parking meters and/or occupancy sensors, security sensors, smart lighting, traffic cameras, advertising displays, point-of-sale terminals, vending machines, remote diagnostics devices, power grid sensors and/or management devices, sensors and/or actuators in manufacturing facilities, health monitoring devices, autonomous vehicles, unmanned aerial drones, and/or other types of devices. UE device 110 may be configured to communicate with base station 120 using discontinuous transmission based on a configuration specification that includes different values for a discontinuous transmission parameter for different QoS classes.

RAN 130 may include base stations 120. Base station 120 may enable UE device 110 to communicate with core network 140. Base station 120 may be configured for one or more Radio Access Technology (RAT) types. For example, base station 120 may include a Fifth Generation (5G) New Radio (NR) base station (e.g., a gNodeB) and/or a Fourth Generation (4G) Long Term Evolution (LTE) base station (e.g., an eNodeB). Each base station 120 may include devices and/or components to enable cellular wireless communication with UE devices 110. For example, base station 120 may cover a set of base station cells, also referred to as base station sectors. That is, each cell may cover a sector (e.g., a 1200 sector, etc.). Base station 120 include a radio frequency (RF) transceiver configured to send and receive wireless signals in the direction of the sector and be configured to communicate with UE devices 110 using a 5G NR air interface, a 4G LTE air interface, and/or using another type of cellular air interface. In some implementations, base station 120 may provide a configuration specification for discontinuous transmissions to UE device 110.

Core network 140 may be managed by a provider of cellular wireless communication services and may manage communication sessions of subscribers connecting to core network 140 via RAN 130. For example, core network 140 may establish an Internet Protocol (IP) connection between UE devices 110 and PDN 150. In some implementations, core network 140 may include a 5G core network. In other implementations, core network 140 may include a 4G core network (e.g., an evolved packet core (EPC) network).

The components of core network 140 may be implemented as dedicated hardware components or as virtualized functions implemented on top of a common shared physical infrastructure using Software Defined Networking (SDN). For example, an SDN controller may implement one or more of the components of core network 140 using an adapter implementing a Virtual Network Function (VNF) virtual machine, a CNF container, an event driven serverless architecture interface, and/or another type of SDN component. The common shared physical infrastructure may be implemented using one or more devices 200 described below with reference to FIG. 2 in a cloud computing center associated with core network 140.

In some implementations, core network 140 may include a device implementing a network node or NF that provides a configuration specification for discontinuous transmissions to UE device 110. If core network 140 includes a 4G core network, the network node may include, for example, a Mobility Management Entity (MME), a Serving Gateway (SGW), a PDN Gateway (PGW), a Policy and Charging Control Function (PCRF), a Home Subscriber Server (HSS), and/or another type of 4G network node. If core network 140 includes a 5G core network, the NF may include, for example, an Access and Mobility Function (AMF), a Session Management Function (SMF), an Application Function (AF), a Unified Data Management (UDM), a Policy Control Function (PCF), a Network Exposure Function (NEF), and/or another type of 5G NF.

PDNs 150-A to 150-Y may each include a PDN connected to core network 140. A particular PDN 150 may be associated with a Data Network Name (DNN) in 5G, and/or an Access Point Name (APN) in 4G, and a UE device may request a connection to PDN 150 using the DNN or APN. PDN 150 may include, and/or be connected to and enable communication with, a local area network (LAN), a wide area network (WAN), a metropolitan area network (MAN), an autonomous system (AS) on the Internet, an optical network, a cable television network, a satellite network, another wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. PDN 150 may include an application server 160 (shown in PDN 150-A in FIG. 1). Application server 160 may provide a configuration specification for discontinuous transmissions to UE device 110.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
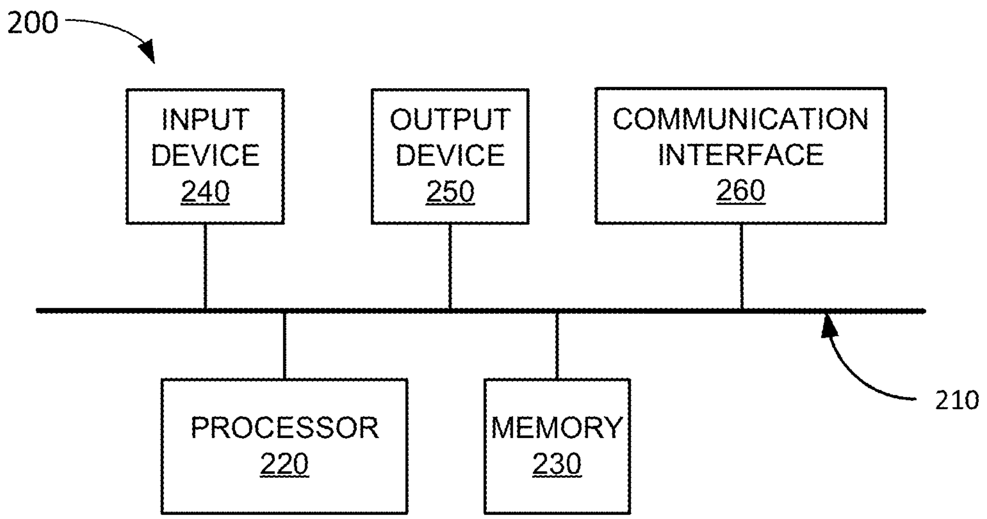
FIG. 2 is a diagram illustrating exemplary components of a device that may be included in an environment according to an implementation described herein.

FIG. 2 illustrates example components of a device 200 according to an implementation described herein. UE device 110, base station 120, core network 140, and/or application server 160 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be “headless” and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be “headless” and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to discontinuous transmissions based on QoS. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
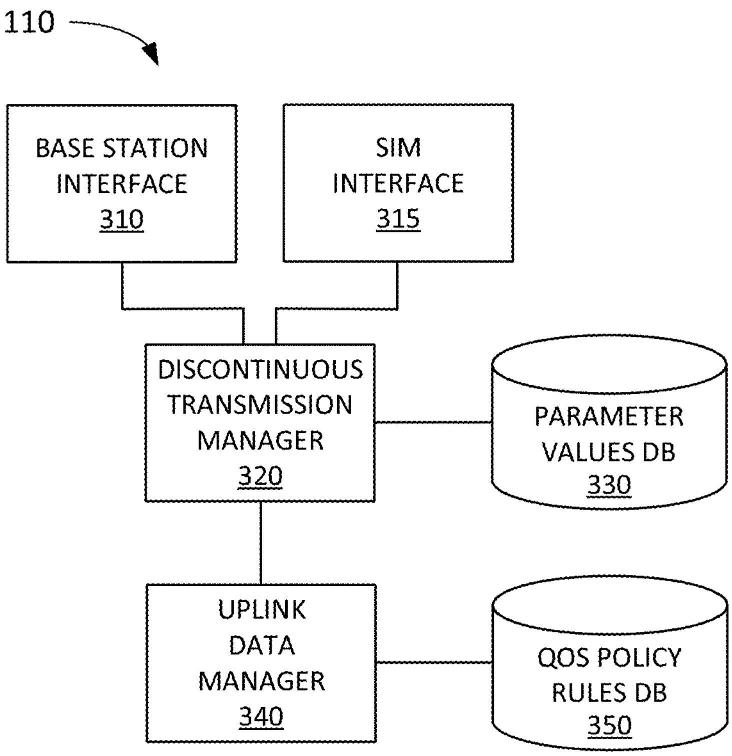
FIG. 3 is a diagram illustrating exemplary components of a user equipment (UE) device according to an implementation described herein.

FIG. 3 is a diagram illustrating exemplary logical components of UE device 110. The components of UE device 110 may be implemented, for example, via processor 220 executing instructions from memory 230. Alternatively, some or all of the components of UE device 110 may be implemented via hard-wired circuitry. As shown in FIG. 3, UE device 110 may include a base station interface 310, a SIM interface 315, a discontinuous transmission manager 320, a parameter values database (DB) 330, an uplink data manager 340, and a QoS policy rules DB 350.

Base station interface 310 may be configured to communicate with base station 120. For example, in some implementations, discontinuous transmission manager 320 may obtain a configuration specification for discontinuous transmission parameters from base station 120, or from core network 140 or application server 160 via base station 120. SIM interface 315 may be configured to communicate with a SIM or a SIM-like component associated with UE device 110. For example, in some implementations, discontinuous transmission manager 320 may obtain a configuration specification for discontinuous transmission parameters from the SIM associated with UE device 110.

Discontinuous transmission manager 320 may manage discontinuous transmission for UE device 110. For example, discontinuous transmission manager 320 may cause UE device 110 to enter a discontinuous transmission mode to conserve battery power. In discontinuous transmission mode, UE device 110 may power down or reduce power to a wireless transceiver included in communication interface 260, other components of communication interface 260, and/or other components of UE device 110. Discontinuous transmission manager 320 may power up the components of UE device 110 which were powered down at particular intervals based on a discontinuous transmission cycle period and may keep the components powered up for an on-duration period before returning the components to a lower power mode. Additionally, discontinuous transmission manager 320 may power up the components of UE device 110 in response to uplink data manager 340 detecting uplink data that is to be sent to base station 120 when in the off-duration part of the discontinuous transmission cycle period. Discontinuous transmission manager 320 may power up the components of UE device 110 and send the uplink data to base station 120 based on parameter values stored in parameter values DB 330. For example, discontinuous transmission manager 320 may send a scheduling request to base station 120 after running a wait timer based on a wait timer value and may send additional scheduling requests based on a scheduling requests period value. Exemplary information that may be stored in parameter values DB 330 is described below with reference to FIG. 4.

Uplink data manager 340 may manage uplink data to be sent to base station 120. For example, uplink data manager 340 may detect uplink data from an application or another type of process running on UE device 110 and may determine a QoS class associated with the uplink data based on a QoS identifier included in data units associated with the uplink data, based on an application identifier associated with the uplink data, and/or based on another type of identifier associated with the uplink data. In some implementations, uplink data manager 340 may determine whether a particular QoS class is enabled on UE device 110 based on information stored in QoS policy rules DB 350. QoS policy rules DB 350 may store QoS policies associated with UE device 10, such as, for example, which QoS classes are to be assigned to which application, whether particular QoS classes are enabled and/or activated for UE device 110, and/or other types of QoS policy information.

Although FIG. 3 shows exemplary logical components of UE device 110, in other implementations, UE device 110 may include fewer logical components, different logical components, additional logical components, or differently arranged logical components than depicted in FIG. 3. Additionally, or alternatively, one or more logical components of UE device 110 may perform one or more tasks described as being performed by one or more other components of UE device 110.

Figure 4:
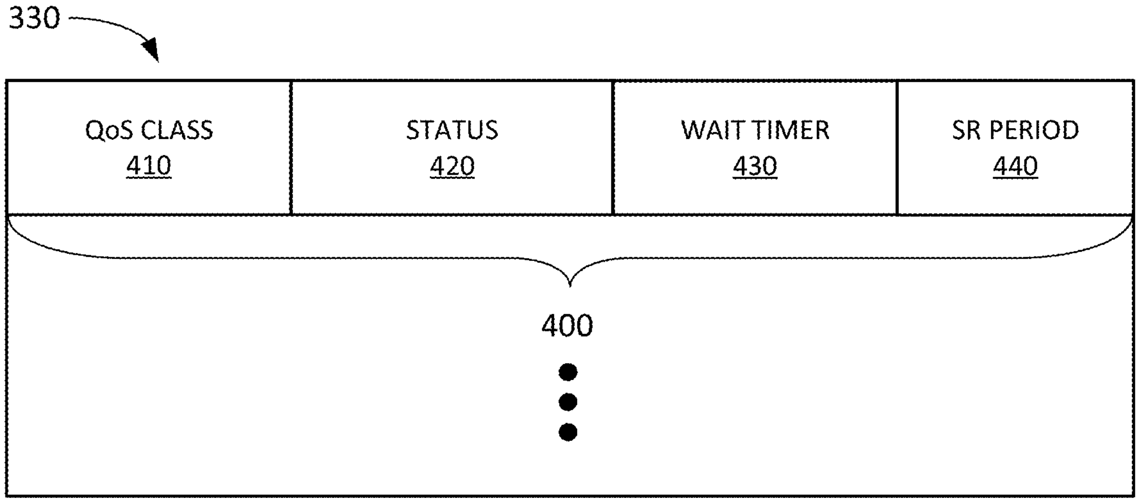
FIG. 4 is a diagram illustrating exemplary components of a parameter values database (DB) according to an implementation described herein.

FIG. 4 is a diagram illustrating exemplary components of parameter values DB 330. As shown in FIG. 4, parameter values DB 330 may include QoS class records 400. Each QoS class record 400 may store information relating a QoS class to a set of discontinuous transmission parameters. In some implementations, parameter values DB 330 may store a default QoS class record 400 and a low latency QoS class record 400 that stores discontinuous transmission parameter values for one or more low latency QoS classes. In other implementations, parameter values DB 330 may store multiple QoS class records 400, such as, for example, a QoS class record 400 for each different QoS class which UE device 110 is configured to use.

QoS class record 400 may include a QoS class field 410, a status field 420, a wait timer field 430, and a scheduling request (SR) period field 440. QoS class field 410 may store information identifying a QoS class which UE device 110 is configured to use. The QoS class may be identified as a QoS Class Identifier (QCI), a 5G QoS Identifier (5QI), and/or another type of QoS identifier. Additionally, or alternatively, QoS class field 410 may store information identifying whether the QoS class is designated as a low latency QoS class.

Status field 420 may store information identifying the status of the QoS class. For example, status field 420 may identify whether the QoS class has been enabled for UE device 110. Some QoS classes may not be enabled for UE device 110 unless a subscription associated UE device 110 enables the QoS classes. Wait timer field 430 may include a wait timer value associated with the QoS class. SR period field 440 may store a scheduling requests period value associated with the QoS class.

Although FIG. 4 shows exemplary components of QoS monitoring criteria DB 425, in other implementations, QoS monitoring criteria DB 425 may include fewer components, different components, additional components, or differently arranged components than depicted in FIG. 4.

Figure 5:
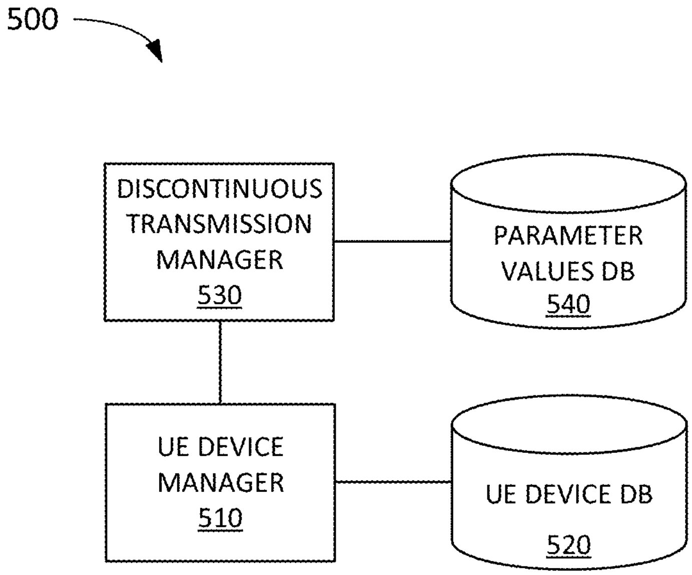
FIG. 5 is a diagram illustrating exemplary components of an application server according to an implementation described herein.

FIG. 5 is a diagram illustrating exemplary components of a device 500 that sends a configuration specification for discontinuous transmissions to UE 110. In some implementations, device 500 may correspond, or be included in, base station 120, a network node or NF in core network 140, and/or application server 160. The components of device 500 may be implemented, for example, via processor 220 executing instructions from memory 230. Alternatively, some or all of the components of device 500 may be implemented via hard-wired circuitry. As shown in FIG. 5, device 500 may include UE device manager 510, a UE device DB 520, a discontinuous transmission manager 530, and a parameter values DB 540.

UE device manager 510 may manage UE devices 110 associated with device 500 based on information stored in UE device DB 520. UE device DB 520 may store information relating to UE devices 110, such as UE devices 110 attached to base station 120, UE devices 110 serviced by core network 140, UE devices 110 associated with application server 160, etc. Discontinuous transmission manager 530 may manage discontinuous transmission for UE devices 110 associated with device 500 based on information stored in parameter values DB 540. Parameter values DB 540 may store configuration specifications for QoS classes. For example, for each QoS class or a group of QoS classes, parameter values DB 540 may store one or more discontinuous parameter values associated with the QoS class or group of QoS classes, such as a wait timer value, a scheduling requests period value, etc. Discontinuous transmission manager 530 may provide a configuration specification to UE device 110 based on information stored in parameter values DB 540.

Although FIG. 5 shows exemplary components of device 500, in other implementations, device 500 may include fewer components, different components, additional components, or differently arranged components than depicted in FIG. 5. Additionally, or alternatively, one or more components of device 500 may perform one or more tasks described as being performed by one or more other components of device 500.

Figure 6:
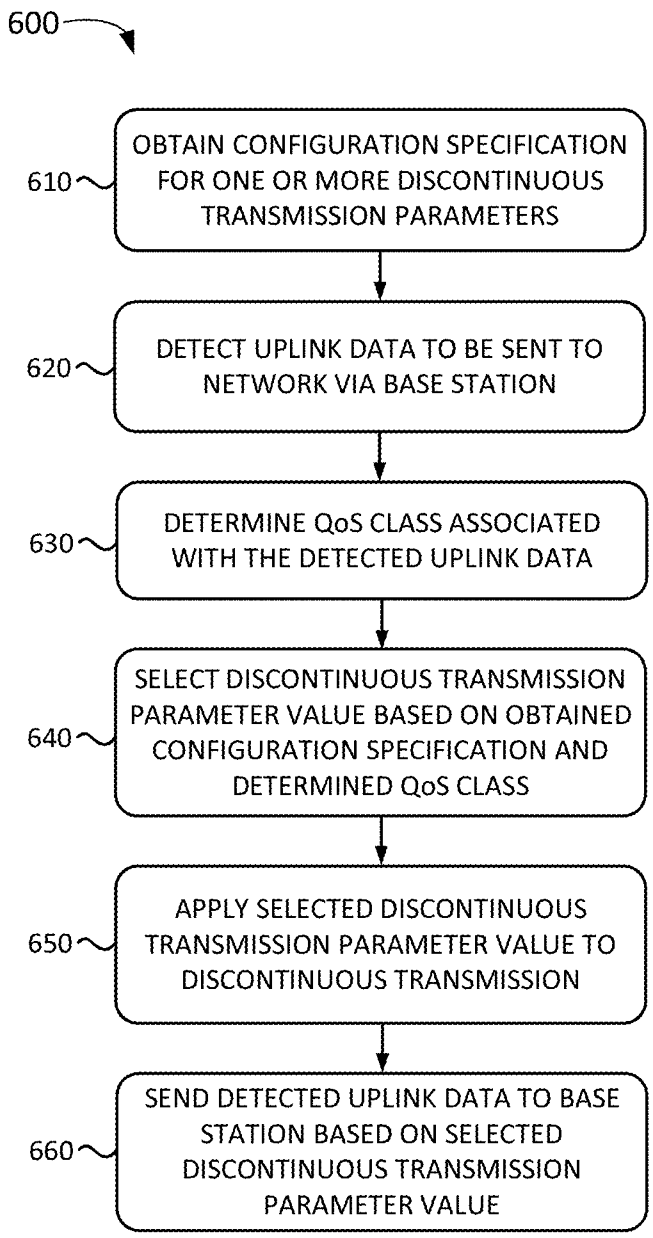
FIG. 6 illustrates a first flowchart for managing discontinuous transmissions according to an implementation described herein.

FIG. 6 illustrates a flowchart of a first process 600 for managing discontinuous transmissions according to an implementation described herein. In some implementations, process 600 may be performed by UE device 110. In other implementations, some or all of process 600 may be performed by another device or a group of devices.

As shown in FIG. 6, process 600 may include obtaining a configuration specification for one or more discontinuous transmission parameters (block 610). As an example, UE device 110 may receive a configuration specification for discontinuous transmission parameters from base station 120 (e.g., via an RRC message), a network node or NF in core network 140, and/or application server 160. As another example, UE device 110 may retrieve a configuration specification from a SIM installed on UE device 110, from a wireless chipset included on UE device 110, and/or from another location associated with UE device 110. UE device 110 may store the obtained configuration specification in parameter values DB 330.

Process 600 may further include detecting uplink data to be sent to the network via a base station (block 620) and determining a QoS class associated with the detected uplink data (block 630). For example, UE device 110 may detect uplink data from an application or another type of process running on UE device 110 and may determine a QoS class associated with the uplink data based on a QoS identifier included in data units associated with the uplink data, based on an application identifier included in data units associated with the uplink data, and/or based on another type of identifier associated with the uplink data.

Process 600 may further include selecting a discontinuous transmission parameter value based on the obtained configuration specification (block 640), applying the selected discontinuous parameter value to discontinuous transmission (block 650), and sending the detected uplink data to the base station based on the selected discontinuous transmission parameter value (block 660). For example, UE device 110 may access parameter values DB 330, identify a QoS class record 400 associated with the determined QoS class, and select a wait timer value and/or a scheduling requests period value associated with the determined QoS class. UE device 110 may then use the selected wait timer value and/or a scheduling requests period value to schedule and send the uplink data to a destination (e.g., application server 160, etc.) via base station 120 using discontinuous transmission.

For example, if the determined QoS class corresponds to a low latency QoS class, UE device 110 may use a wait timer value of 1 ms and wait 1 ms before sending a scheduling request to base station 120, and send subsequent scheduling requests, if the scheduling request is not granted by base station 120, at an interval of 1 ms based on a scheduling requests period of 1 ms. As another example, if the determined QoS class does not correspond to a low latency QoS class, UE device 110 may use a wait timer value of 10 ms and wait 10 ms before sending a scheduling request to base station 120, and send subsequent scheduling requests, if the scheduling request is not granted by base station 120, at an interval of 20 ms based on a scheduling requests period of 20 ms.

Figure 7:
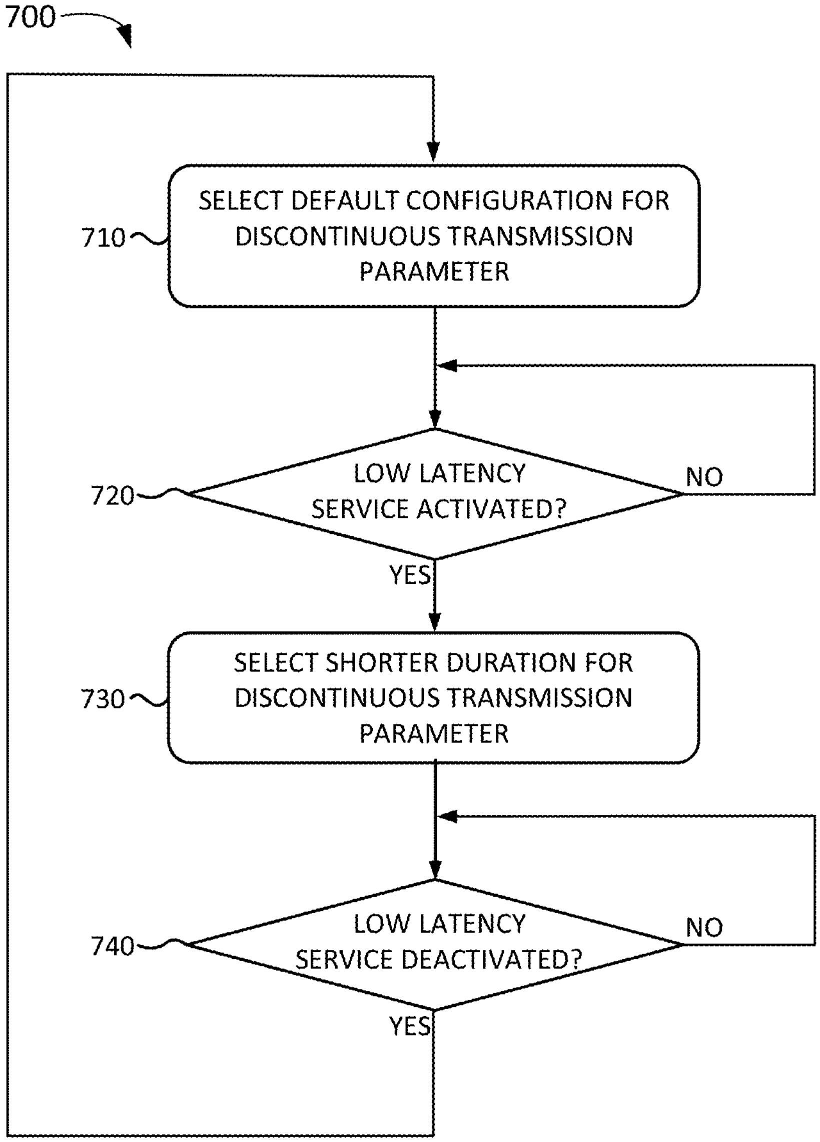
FIG. 7 illustrates a second flowchart for managing discontinuous transmissions according to an implementation described herein.

FIG. 7 illustrates a flowchart of a second process 700 for managing discontinuous transmissions according to an implementation described herein. In some implementations, process 700 may be performed by UE device 110. In other implementations, some or all of process 700 may be performed by another device or a group of devices.

As shown in FIG. 7, process 700 may include selecting a default configuration for a discontinuous transmission parameter (block 710). For example, UE device 110 may start operating using a default configuration for a discontinuous transmission parameter. As an example, UE device 110 may include an initial configuration specification for a wait timer value of 10 ms and a scheduling requests period value of 20 ms.

Process 700 may further include determining whether a low latency service has been activated (block 720). For example, UE device 110 may access QoS policy rules DB 350 to determine whether a low latency service has been activated by core network 140 for UE device 110. If it is determined that a low latency service has not been activated (block 720—NO), processing may return to block 720 to monitor whether the low latency service has been activated. If it is determined that the low latency service has been activated (block 720—YES), a shorter duration for the discontinuous parameter may be selected (block 730). As an example, UE device 110 may reduce the duration of the wait timer (e.g., from 10 ms to 1 ms, etc.). As another example, UE device 110 may reduce the duration of a scheduling requests period (e.g., from 20 ms to 1 ms, etc.).

Process 700 may further include determining whether a low latency service has been deactivated (block 740). For example, UE device 110 may access QoS policy rules DB 350 to determine whether a low latency service has been deactivated by core network 140 for UE device 110. If it is determined that a low latency service has not been deactivated (block 740—NO), processing may return to block 740 to continue to monitor whether the low latency service has been deactivated. If it is determined that the low latency service has been deactivated (block 740—YES), processing may return to block 710 to re-select the default configuration for the discontinuous transmission parameter. As an example, UE device 110 may return the duration of the wait timer to a default value (e.g., from 1 ms back to 10 ms, etc.). As another example, UE device 110 may return the duration of a scheduling requests period to a default value (e.g., from 1 ms back to 20 ms, etc.).

Figure 8:
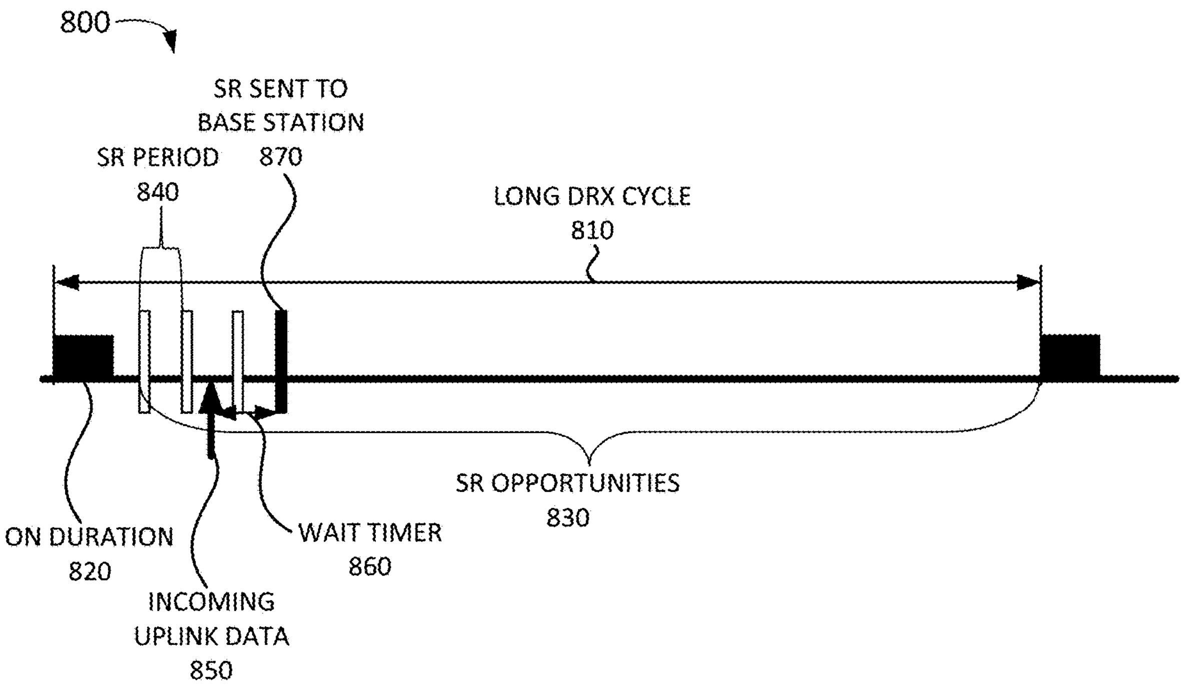
FIG. 8 is a plot of scheduling requests over time while in a discontinuous transmission mode according to an implementation described herein.

FIG. 8 is a plot 800 of scheduling requests over time while in discontinuous transmission mode according to an implementation described herein. As shown in FIG. 8, plot 800 may include a long discontinuous reception (DRX) cycle that includes an on-duration period 820. During on-duration period 820, UE device 110 may receive downlink data from base station 120 and may send uplink data to base station 120 using standard communication procedures. Outside the on-duration period 820, UE device 110 may be in a sleep or reduced power mode with the wireless transceiver in a off-power or reduced power state, with a scheduling requests opportunities period 830 during which scheduling requests may be sent to base station 120.

Scheduling requests 840 may be sent based on a scheduling requests period. For example, if the scheduling requests period corresponds to 20 ms, then a scheduling request may be sent each 20 ms. If incoming uplink data 850 is detected, UE device 110 may wait for a period corresponding to the wait timer value 860 before sending a scheduling request to base station 120. If the scheduling request is granted by base station 120, UE device 110 may send the uplink data to base station 120. If the scheduling request is not granted, UE device 110 may send a subsequent scheduling request to base station 120 after the scheduling requests period time elapses.

Figure 9:
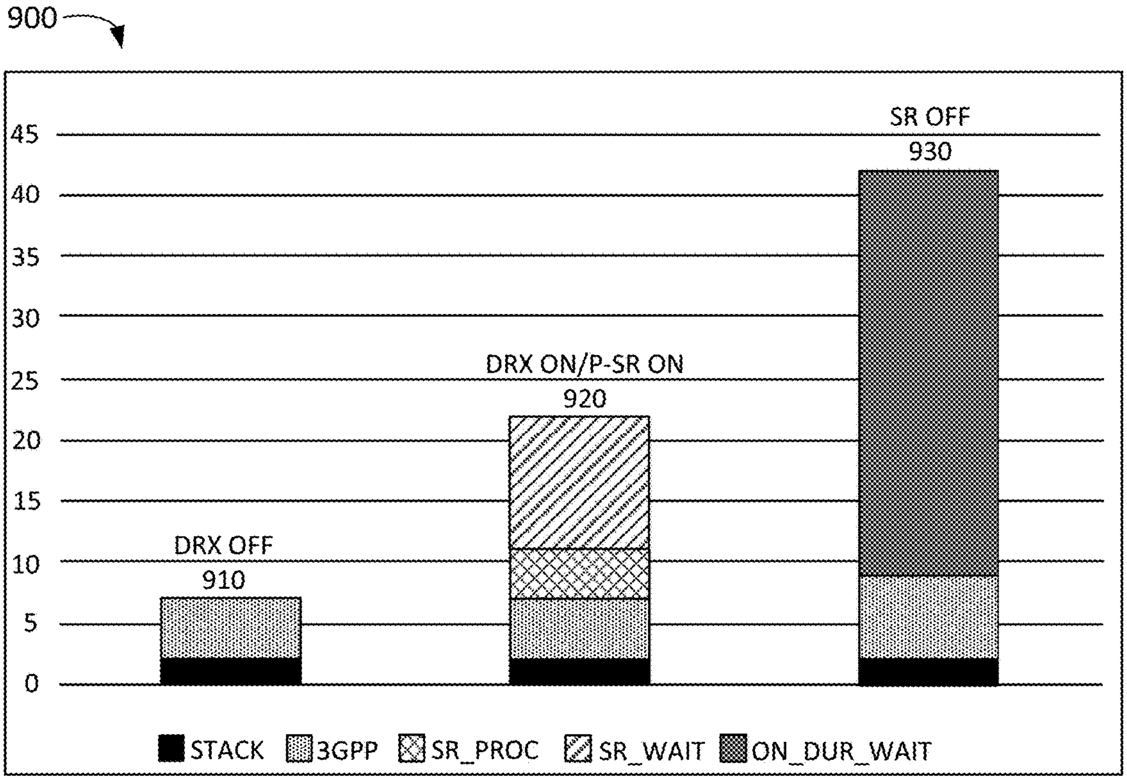
FIG. 9 is a time plot of different discontinuous transmission situations according to an implementation described herein.

FIG. 9 illustrates a plot 900 of time duration for different discontinuous transmission situations according to an implementation described herein. As shown in FIG. 9, plot 900 includes a first bar plot 910, a second bar plot 920, and a third bar plot 930. First bar plot 910 illustrates the time to send uplink data to base station 120 when discontinuous reception (DRX) and transmission is off and UE device 110 is able to send uplink data to base station 110 immediately. In first bar plot 910, the time to send uplink data to base station 120 corresponds to a sum of the time required by the physical and Third Generation Partnership Project (3GPP) protocol stacks.

Second bar plot 920 illustrates the time to send uplink data to base station 120 in discontinuous transmission mode with scheduling requests activated. In second bar plot 920, the time to send uplink data to base station 120 corresponds a sum of the time required by the physical and 3GPP protocol stacks, the processing of a scheduling request, and the duration of the wait timer. Third bar plot 930 illustrates the time to send uplink data to base station 120 in discontinuous transmission mode with scheduling requests deactivated. With the scheduling requests deactivated, UE device 110 has to wait until the on-duration time period to send uplink data to base station 120. Thus, in third bar plot 920, the time to send uplink data to base station 120 corresponds a sum of the time required by the physical and 3GPP protocol stacks and the long DRX cycle time period. Therefore, as can be seen from the bar plots in plot 900, reducing the wait timer and the scheduling requests period may result in significant reduction of latency in sending uplink data to base station 120 when UE device is in discontinuous transmission mode.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

obtaining, by a user equipment (UE) device, a configuration specification for at least one discontinuous transmission parameter, wherein the configuration specification includes different values for at least two different Quality of Service (QoS) classes, wherein the at least one discontinuous transmission parameter includes at least one of:

a wait timer configured to cause the UE device to wait a particular time period after detecting uplink data before sending a scheduling request to a base station; or a period for sending scheduling requests to the base station;

storing, by the UE device, the different values for the at least two different QoS classes into a discontinuous transmission parameter values database on the UE device;

detecting, by the UE device, uplink data that is to be sent by the UE device to a device via the base station;

determining, by the UE device, a QoS class associated with the uplink data;

autonomously selecting, by the UE device, a value for the at least one discontinuous transmission parameter from the discontinuous transmission parameter values database based on the determined QoS class associated with the uplink data, without receiving, from the base station at the time of detecting the uplink data, an instruction specifying the value for the at least one discontinuous transmission parameter; and sending, by the UE device, the uplink data to the base station based on the selected value for the at least one discontinuous transmission parameter.

2. The method of claim 1, wherein obtaining the configuration specification for the at least one discontinuous transmission parameter includes:

retrieving the configuration specification from a Subscriber Identity Module (SIM) or from a wireless chipset associated with the UE device.

3. The method of claim 1, wherein obtaining the configuration specification for the at least one discontinuous transmission parameter includes:

receiving a message from a device associated with a provider network via the base station, wherein the message includes the configuration specification.

4. The method of claim 3, wherein the message includes a Radio Resource Control (RRC) message.

5. The method of claim 1, wherein the configuration specification includes an instruction to activate a parameter value, for the at least one discontinuous transmission parameter, which indicates a duration shorter than a default value for the at least one discontinuous transmission parameter, for uplink data associated with a low latency QoS class.

6. The method of claim 1, wherein, when the discontinuous transmission parameter includes the wait timer, the configuration specification includes a wait timer value of 1 millisecond or less for uplink data associated with a low latency QoS class.

7. The method of claim 1, wherein, when the discontinuous transmission parameter includes the period, for sending scheduling requests, the configuration specification includes a period value which indicates a duration shorter than a default period value for sending scheduling requests, for uplink data associated with a low latency QoS class.

8. A user equipment (UE) device comprising:

a processor configured to:

obtain a configuration specification for at least one discontinuous transmission parameter, wherein the configuration specification includes different values for at least two different Quality of Service (QoS) classes, wherein the at least one discontinuous transmission parameter includes at least one of:

a wait timer configured to cause the UE device to wait a particular time period after detecting uplink data before sending a scheduling request to a base station; or a period for sending scheduling requests to the base station;

store the different values for the at least two different QoS classes into a discontinuous transmission parameter values database on the UE device;

detect uplink data that is to be sent by the UE device to a device via the base station;

determine a QoS class associated with the uplink data;

autonomously select a value for the at least one discontinuous transmission parameter from the discontinuous transmission parameter values database based on the determined QoS class associated with the uplink data, without receiving, from the base station at the time of detecting the uplink data, an instruction specifying the value for the at least one discontinuous transmission parameter; and send the uplink data to the base station based on the selected value for the at least one discontinuous transmission parameter.

9. The UE device of claim 8, wherein, when obtaining the configuration specification for the at least one discontinuous transmission parameter, the processor is further configured to:

retrieve the configuration specification from a Subscriber Identity Module (SIM) or from a wireless chipset associated with the UE device.

10. The UE device of claim 8, wherein, when obtaining the configuration specification for the at least one discontinuous transmission parameter, the processor is further configured to:

receive a message from a device associated with a provider network via the base station, wherein the message includes the configuration specification.

11. The UE device of claim 10, wherein the message includes a Radio Resource Control (RRC) message.

12. The UE device of claim 8, wherein the configuration specification includes an instruction to activate a parameter value, for the at least one discontinuous transmission parameter, which indicates a duration shorter than a default value for the at least one discontinuous transmission parameter, for uplink data associated with a low latency QoS class.

13. The UE device of claim 8, wherein, when the discontinuous transmission parameter includes the wait timer, the configuration specification includes a wait timer value of 1 millisecond or less for uplink data associated with a low latency QoS class.

14. The UE device of claim 8, wherein, when the discontinuous transmission parameter includes the period for sending scheduling requests to the base station, the configuration specification includes a period value which indicates a time shorter in duration than a default period value for sending scheduling requests, for uplink data associated with a low latency QoS class.

15. A non-transitory computer-readable memory device that stores instructions executable on a processor, the non-transitory computer-readable memory device comprising one or more instructions that cause the processor to:

obtain, by a user equipment (UE) device, a configuration specification for at least one discontinuous transmission parameter, wherein the configuration specification includes different values for at least two different Quality of Service (QoS) classes, wherein the at least one discontinuous transmission parameter includes at least one of:

a wait timer configured to cause the UE device to wait a particular time period after detecting uplink data before sending a scheduling request to a base station; or a period for sending scheduling requests to the base station;

store the different values for the at least two different QoS classes into a discontinuous transmission parameter values database on the UE device;

detect uplink data that is to be sent by the UE device to a device via the base station;

determine a QoS class associated with the uplink data;

autonomously select a value for the at least one discontinuous transmission parameter from the discontinuous transmission parameter values database based on the determined QoS class associated with the uplink data, without receiving, from the base station at the time of detecting the uplink data, an instruction specifying the value for the at least one discontinuous transmission parameter; and send the uplink data to the base station based on the selected value for the at least one discontinuous transmission parameter.

16. The non-transitory computer-readable memory device of claim 15, wherein, when obtaining the configuration specification for the at least one discontinuous transmission parameter, the instructions are further configured to cause the processor to:

retrieve the configuration specification from a Subscriber Identity Module (SIM) or from a wireless chipset associated with the UE device.

17. The non-transitory computer-readable memory device of claim 15, wherein, when obtaining the configuration specification for the at least one discontinuous transmission parameter, the instructions are further configured to cause the processor to:

receive a message from a device associated with a provider network via the base station, wherein the message includes the configuration specification.

18. The non-transitory computer-readable memory device of claim 15, wherein the configuration specification includes an instruction to activate a parameter value, for the at least one discontinuous transmission parameter, which indicates a duration shorter than a default value for the at least one discontinuous transmission parameter, for uplink data associated with a low latency QoS class.

19. The non-transitory computer-readable memory device of claim 15, wherein, when the discontinuous transmission parameter includes the wait timer, the configuration specification includes a wait timer value of 1 millisecond or less for uplink data associated with a low latency QoS class.

20. The non-transitory computer-readable memory device of claim 15, wherein, when the discontinuous transmission parameter includes the period for sending scheduling requests to the base station, the configuration specification includes a period value which indicates a time shorter in duration than a default period value for sending scheduling requests, for uplink data associated with a low latency QoS class.

* * * * *